(12) United States Patent
Schmidt et al.

(10) Patent No.: US 12,104,520 B2
(45) Date of Patent: Oct. 1, 2024

(54) CYLINDER HEAD WITH INTEGRATED TURBOCHARGER

(71) Applicants: Michael P Schmidt, Highland, MI (US); Nikhil Punneri Madathil, Rochester Hills, MI (US); Alan G Falkowski, Lake Orion, MI (US); Michael D Buss, Macomb, MI (US); Constantin Hagiu, Windsor (CA); Douglas A Trudeau, Lake Orion, MI (US)

(72) Inventors: Michael P Schmidt, Highland, MI (US); Nikhil Punneri Madathil, Rochester Hills, MI (US); Alan G Falkowski, Lake Orion, MI (US); Michael D Buss, Macomb, MI (US); Constantin Hagiu, Windsor (CA); Douglas A Trudeau, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/864,237

(22) Filed: May 1, 2020

(65) Prior Publication Data

US 2020/0347773 A1    Nov. 5, 2020

Related U.S. Application Data

(60) Provisional application No. 62/841,916, filed on May 2, 2019.

(51) Int. Cl.
*F01P 3/12*      (2006.01)
*F01N 13/10*    (2010.01)
(Continued)

(52) U.S. Cl.
CPC ............... *F01P 3/12* (2013.01); *F01N 13/10* (2013.01); *F01P 11/0276* (2013.01);
(Continued)

(58) Field of Classification Search
CPC .......... F01D 25/24; F01D 9/026; F01N 13/10; F01N 13/105; F01P 11/0276;
(Continued)

(56) References Cited

U.S. PATENT DOCUMENTS 7,784,442 B2    8/2010    Lester et al.
8,459,024 B2    6/2013    Koch
(Continued)

FOREIGN PATENT DOCUMENTS

EP    2143925 A1    1/2010
EP    2392794 A1    12/2011
JP    2006063851 A    3/2006

*Primary Examiner* — Grant Moubry
*Assistant Examiner* — Ruben Picon-Feliciano
(74) *Attorney, Agent, or Firm* — Jeremy J. Klobucar

(57) ABSTRACT

A cylinder head assembly for an internal combustion engine includes a cast cylinder head, a turbocharger housing integrally cast with the cylinder head, and a water jacket cast into the integrally cast turbocharger housing and configured to receive a flow of coolant for cooling the integrally cast turbocharger housing. The assembly can also include a wastegate housing integrally cast with the cylinder head and the turbocharger housing, and a water jacket cast into the integrally cast wastegate housing. The water jacket is configured to receive a flow of coolant for cooling the integrally cast turbocharger housing and the integrally cast wastegate housing.

8 Claims, 12 Drawing Sheets

(51) Int. Cl.
- *F01P 11/02* (2006.01)
- *F02B 29/04* (2006.01)
- *F02B 33/40* (2006.01)
- *F02B 37/18* (2006.01)
- *F02F 1/26* (2006.01)
- *F02F 1/36* (2006.01)

(52) U.S. Cl.
CPC ...... *F02B 29/0443* (2013.01); *F02B 29/0475* (2013.01); *F02B 33/40* (2013.01); *F02B 37/183* (2013.01); *F02B 37/186* (2013.01); *F02F 1/26* (2013.01); *F02F 1/36* (2013.01); *F01P 2060/12* (2013.01); *F02F 2200/06* (2013.01)

(58) Field of Classification Search
CPC ..... F01P 2060/12; F01P 3/12; F02B 29/0443; F02B 29/0475; F02B 33/40; F02B 37/00; F02B 37/02; F02B 37/18; F02B 37/183; F02B 37/186; F02B 39/005; F02F 1/243; F02F 1/26; F02F 1/36; F02F 1/40; F02F 2200/06; F05D 2220/40; F05D 2230/21; F05D 2240/14; Y02T 10/12

See application file for complete search history.

(56) References Cited

U.S. PATENT DOCUMENTS

| | | | |
|---|---|---|---|
| 8,555,825 | B2 | 10/2013 | Lenz et al. |
| 8,621,865 | B2 | 1/2014 | Mehring et al. |
| 8,875,670 | B2 | 11/2014 | Brewer et al. |
| 8,966,894 | B2 | 3/2015 | Marques et al. |
| 8,984,880 | B2 | 3/2015 | Marques et al. |
| 9,194,282 | B2 | 11/2015 | Serres et al. |
| 9,683,482 | B2 | 6/2017 | Fäth et al. |
| 2011/0173972 | A1* | 7/2011 | Wade ............... F02B 39/00 60/602 |
| 2012/0011845 | A1 | 1/2012 | Williams et al. |
| 2012/0192557 | A1 | 8/2012 | Johnson et al. |
| 2013/0055713 | A1 | 3/2013 | Drangel et al. |
| 2013/0287564 | A1 | 10/2013 | Fäth et al. |
| 2014/0165556 | A1 | 6/2014 | Plagens et al. |
| 2014/0326215 | A1 | 11/2014 | Haefner et al. |
| 2015/0007800 | A1* | 1/2015 | Wade ............... F02M 26/14 123/568.14 |
| 2018/0163620 | A1* | 6/2018 | Eriksson ............ F02B 39/14 |

* cited by examiner

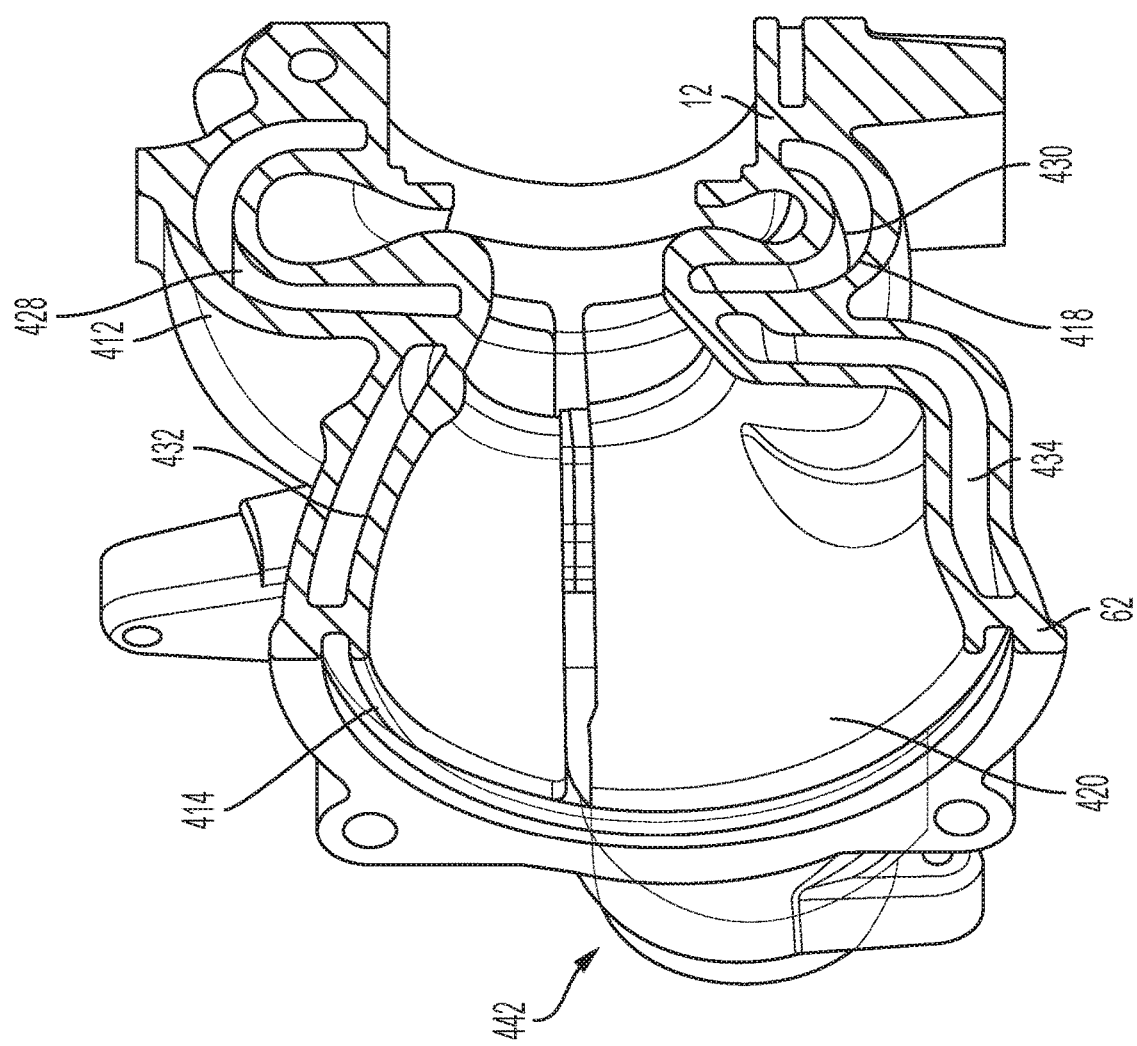

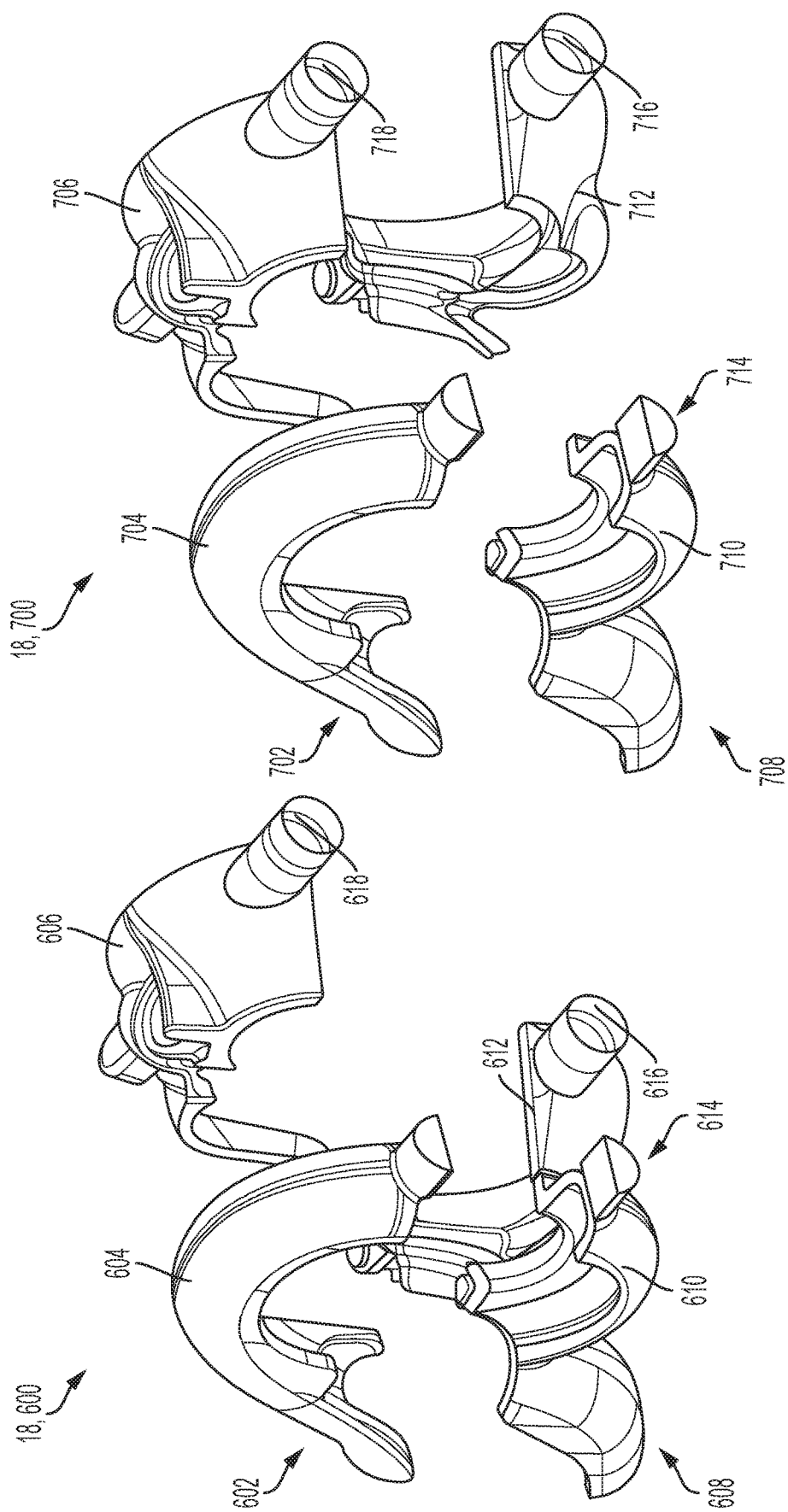

CYLINDER HEAD WITH INTEGRATED TURBOCHARGER

CROSS REFERENCE TO RELATED APPLICATION

This application claims the benefit of U.S. Provisional Pat. App. No. 62/841,916, filed May 2, 2019, the contents of which are incorporated herein by reference thereto.

FIELD

The present application relates generally to internal combustion engines having a turbocharger and, more particularly, to an internal combustion engine having a cylinder head with an integrated turbocharger.

BACKGROUND

Turbocharger systems typically account for a good portion of the cost of an engine. Moreover, typical gasoline engine turbine housings have significant amounts of nickel and chrome, thereby accounting for a large portion of the cost of the turbocharger. Further, gaskets, fasteners, mating tubes, ducts and other components associated with the turbocharger often need to be made of premium materials, for example, due to heat, pressure, and vibration induced from the turbocharger. While such turbocharger systems do work well for their intended purpose, it is desirable to provide continuous improvement in the relevant art by reducing cost and complexity.

SUMMARY

In accordance with one example aspect of the invention, a cylinder head assembly for an internal combustion engine is provided. In one example implementation, the assembly includes a cast cylinder head and a turbocharger housing integrally cast with the cylinder head and having an integrally cast wastegate housing. The turbocharger housing is configured to receive a turbocharger cartridge rotatably supporting a shaft coupled between a compressor wheel and a turbine wheel. The integrally cast wastegate housing defines a wastegate chamber configured to receive a wastegate valve, a flow of exhaust gas from the turbine wheel, and a flow of wastegate exhaust gas.

In addition to the foregoing, the described assembly may include one or more of the following features: wherein the integrally cast wastegate housing includes a wastegate valve seat defining a wastegate inlet configured to receive the flow of wastegate exhaust gas; wherein the integrally cast turbocharger housing includes an integrally cast wastegate duct configured to supply the flow of wastegate exhaust gas to the wastegate inlet; a wastegate valve coupled to the integrally cast wastegate housing and configured to selectively close the wastegate inlet by sealing against the wastegate valve seat; a direct drive wastegate valve actuator operably coupled to the wastegate valve; wherein the direct drive wastegate valve actuator is configured to open the valve beyond 90° from a closed position; and wherein the direct drive wastegate valve actuator is configured to open the valve beyond 180° from a closed position to increase the flow of wastegate exhaust gas by blocking the flow of exhaust gas from the turbine wheel.

In addition to the foregoing, the described assembly may include one or more of the following features: wherein the direct drive wastegate valve actuator does not include pinned connections or a wastegate rod; wherein the integrally cast wastegate housing includes a wastegate actuator bore formed therethrough; a wastegate valve having a shaft extending into the wastegate actuator bore; wherein an interior wall of the integrally cast wastegate housing includes a wastegate valve assembly clearance configured to provide a clearance for inserting the wastegate valve into the wastegate chamber to enable insertion of the shaft into the wastegate actuator bore; a bushing received within the actuator bore, wherein the shaft is received with in the actuator bore and coupled thereto for rotational movement; a wastegate valve actuator assembly operably coupled to the shaft to selectively move the wastegate valve between open and closed positions.

In addition to the foregoing, the described assembly may include one or more of the following features: a coupling between the wastegate valve actuator assembly and the wastegate valve; wherein the coupling is an Oldham coupling; wherein the wastegate valve actuator assembly includes a direct drive motor having an output shaft coupled to the shaft of the wastegate valve; and wherein the integrally cast turbocharger housing includes a pair of outwardly extending posts, and the wastegate valve actuator assembly includes a housing having a pair of coupling flanges coupled to the pair of outwardly extending posts.

In accordance with another example aspect of the invention, a cylinder head assembly for an internal combustion engine is provided. In one example implementation, the assembly includes a cast cylinder head and a charge air cooler (CAC) passage cast into the cylinder head. The cast CAC passage includes a first end and an opposite second end. The first end is configured to fluidly couple to an outlet of a turbocharger compressor to receive compressed charge air. The second end is configured to fluidly couple to a charge air cooler configured to cool the compressed charge air.

In addition to the foregoing, the described cylinder head assembly may include one or more of the following features: a first section extending substantially parallel to a longitudinal axis of the cylinder head, a second section extending substantially orthogonal to the longitudinal axis, and a third section extending substantially orthogonal to both the longitudinal axis and the second section.

In accordance with another example aspect of the invention, a cylinder head assembly for an internal combustion engine is provided. In one example implementation, the assembly includes a cast cylinder head and a turbocharger housing integrally cast with the cylinder head and having an integrally cast wastegate housing. The turbocharger housing is configured to receive a turbocharger cartridge rotatably supporting a shaft coupled between a compressor wheel and a turbine wheel. A charge air cooler (CAC) passage is cast into the cylinder head and includes a first end and an opposite second end. The first end is configured to fluidly couple to an outlet of a turbocharger compressor to receive compressed charge air, and the second end is configured to fluidly couple to a charge air cooler configured to cool the compressed charge air. The integrally cast wastegate housing defines a wastegate chamber configured to receive a wastegate valve, a flow of exhaust gas from the turbine wheel, and a flow of wastegate exhaust gas.

In accordance with another example aspect of the invention, a cylinder head assembly for an internal combustion engine is provided. In one example implementation, the assembly includes a cast cylinder head and a turbocharger housing integrally cast with the cylinder head. A water jacket is cast into the integrally cast turbocharger housing and is configured to receive a flow of coolant for cooling the integrally cast turbocharger housing.

In addition to the foregoing, the described assembly may include one or more of the following features: wherein the water jacket includes an upper turbocharger housing water jacket configured to receive a first flow of coolant for cooling an upper portion of the integrally cast turbocharger housing, and a lower turbocharger housing water jacket configured to receive a second flow of coolant for cooling a lower portion of the integrally cast turbocharger housing; wherein the integrally cast turbocharger housing is configured to direct a flow of exhaust gas from a turbocharger turbine between the upper turbocharger housing water jacket and the lower turbocharger housing water jacket; wherein the integrally cast turbocharger housing is configured to direct a flow of wastegate exhaust gas from an exhaust manifold between the upper turbocharger housing water jacket and the lower turbocharger housing water jacket.

In addition to the foregoing, the described assembly may include one or more of the following features: wherein the upper turbocharger housing water jacket and the lower turbocharger housing water jacket fluidly connect at an end coupling of the integrally cast turbocharger housing; a plug disposed within the end coupling; wherein the integrally cast turbocharger housing includes a coolant outlet formed therein and configured to remove the flow of coolant from the integrally cast water jacket; and wherein the water jacket comprises a turbocharger housing water jacket portion cast into the integrally cast turbocharger housing and a cylinder head water jacket portion cast into the cylinder head and configured to receive a flow of coolant for cooling exhaust gas supplied through an exhaust manifold to the integrally cast turbocharger housing, wherein the turbocharger housing water jacket portion is fluidly coupled to the cylinder head water jacket portion.

In addition to the foregoing, the described assembly may include one or more of the following features: wherein the water jacket comprises an upper water jacket and a lower water jacket, wherein the upper water jacket includes an upper turbocharger housing water jacket fluidly coupled with an upper cylinder head water jacket, and wherein the lower water jacket includes a lower turbocharger housing water jacket fluidly coupled with a lower cylinder head water jacket.

In accordance with another example aspect of the invention, a cylinder head assembly for an internal combustion engine is provided. In one example implementation, the assembly includes a cast cylinder head, a turbocharger housing integrally cast with the cylinder head, a wastegate housing integrally cast with the cylinder head and the turbocharger housing, and a water jacket cast into the integrally cast turbocharger housing and wastegate housing, the water jacket configured to receive a flow of coolant for cooling the integrally cast turbocharger housing and the integrally cast wastegate housing.

In addition to the foregoing, the described assembly may include one or more of the following features: wherein the integrally cast turbocharger housing includes an integrated turbine inlet duct configured to direct a turbine portion of exhaust gas flow to a turbocharger turbine wheel, wherein the integrally cast wastegate housing includes an integrated wastegate duct configured to direct a wastegate portion of exhaust gas flow to a wastegate chamber defined in the integrally cast wastegate housing; wherein the water jacket includes an upper turbocharger housing water jacket configured to receive a first flow of coolant for cooling an upper portion of the integrally cast turbocharger housing, a lower turbocharger housing water jacket configured to receive a second flow of coolant for cooling a lower portion of the integrally cast turbocharger housing, an upper wastegate housing water jacket configured to receive a third flow of coolant for cooling an upper portion of the integrally cast wastegate housing, and a lower wastegate housing water jacket configured to receive a fourth flow of coolant for cooling a lower portion of the integrally cast wastegate housing.

In addition to the foregoing, the described assembly may include one or more of the following features: wherein the integrally cast turbocharger housing is configured to direct a flow of exhaust gas from a turbocharger turbine between the upper turbocharger housing water jacket and the lower turbocharger housing water jacket; wherein the integrally cast wastegate housing is configured to direct a flow of wastegate exhaust gas between the upper wastegate housing water jacket and the lower wastegate housing water jacket; wherein the upper turbocharger housing water jacket and the lower turbocharger housing water jacket fluidly connect at an end coupling of the integrally cast turbocharger housing; and wherein the upper wastegate housing water jacket and the lower wastegate housing water jacket are fluidly coupled to the upper turbocharger housing water jacket and the lower turbocharger housing water jacket.

In addition to the foregoing, the described assembly may include one or more of the following features: wherein the integrally cast wastegate housing includes a coolant outlet formed therein and configured to receive the flow of coolant from the integrally cast water jacket; and wherein the water jacket includes a turbocharger housing water jacket portion cast into the integrally cast turbocharger housing. a wastegate housing water jacket portion cast into the integrally cast wastegate housing, and a cylinder head water jacket portion cast into the cylinder head and configured to receive a flow of coolant for cooling the cylinder head, wherein the turbocharger housing water jacket portion is fluidly coupled to the cylinder head water jacket portion, and wherein the wastegate housing water jacket portion is fluidly coupled to the cylinder head water jacket portion.

In addition to the foregoing, the described assembly may include one or more of the following features: wherein the water jacket comprises an upper water jacket and a lower water jacket, wherein the upper water jacket includes an upper turbocharger housing water jacket and an upper wastegate housing water jacket fluidly coupled with an upper cylinder head water jacket, and wherein the lower water jacket includes a lower turbocharger housing water jacket and a lower wastegate housing water jacket fluidly coupled with a lower cylinder head water jacket; and wherein the water jacket is formed by one of: (i) two water jacket cores, (ii) three water jacket cores, and (iii) four water jacket cores.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 10 is a sectional view of the water jacket system shown in FIG. 9 and taken along line 10-10, in accordance with the principles of the present application;

FIG. 13 is a perspective view of yet another example water jacket system that may be cast within the cylinder head shown in FIG. 1, in accordance with the principles of the present application;

FIG. 14 is a perspective view of yet another example water jacket system that may be cast within the cylinder head shown in FIG. 1, in accordance with the principles of the present application.

DESCRIPTION

Figures 1, 2:
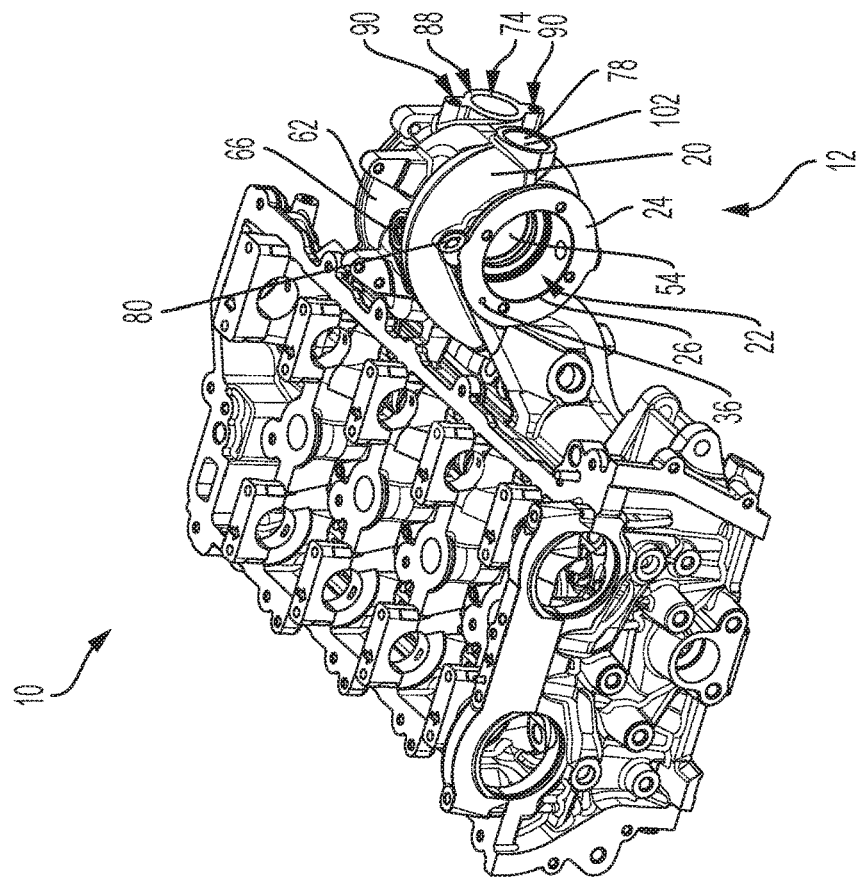
FIG. 1 is a perspective view of an example cylinder head casting with an integrally cast turbocharger housing in accordance with the principles of the present application.
FIG. 2 is another perspective view of the example cylinder head shown in FIG. 1, in accordance with the principles of the present application.

Described herein are systems and methods for integrally casting features or components into the cylinder head of an internal combustion engine. Typically, an internal combustion engine is a compact mix of hardware often required to fit in very tight underhood spaces. When components with high mass and density, such as turbocharger systems, are bolted externally to an engine, the resulting structure can potentially affect NVH, dynamics, packaging, decking, durability, etc.

In order to reduce or prevent such issues in the present disclosure, the turbocharger housing is integrated (e.g., cast) into an aluminum cylinder head, which is advantageously configured to reduce engine cost, improve packaging, simplify assembly, reduce number of assembly steps, improve catalyst light off emissions, reduce turbocharger noise (e.g., wastegate resonances, flow noise, rotor group unbalance whine, etc.), improve engine warm up, and improve fuel economy.

Further, the disclosed system integrates the entire wastegate system, compressor inlet/outlet, and the turbine inlet/outlet into the cylinder head. As such, no additional heat shields are required. Additionally, the fully integrated wastegate system includes a direct drive actuator configured to open the wastegate beyond the typical 30° maximum and open the valve beyond 90° as far as is needed to fully bypass the wastegate channel. Additionally, if the wastegate is opened beyond 180° the wastegate flow can be increased by blocking turbine wheel exducer flow with the backside of the valve. Further, the direct drive wastegate does not include pinned connections or a wastegate rod, thereby eliminating common sources of potential system resonance.

Further, traditional turbocharger housings are made of steel, which convects heat from the hot exhaust gasses to the ambient air. The steel mechanical properties are such that it achieves the required durability. Since in some examples of the present disclosure the turbocharger housing is integrated into an aluminum cylinder head, in order to maintain durability, water cooling passages and water flow rates are provided to properly maintain the aluminum material within temperatures that allow its strength to achieve the required durability. Such features reduce or prevent insufficient cooling of aluminum exhaust passages, which can potentially lead to water jacket coolant boiling that could lead to material erosion and coolant leaks, and aluminum wall fatigue cracking which may also lead to coolant leaks.

In some examples, the disclosed design is configured to cool the turbocharger housing's aluminum exhaust passages by providing turbocharger housing water jackets: (i) integrated with the cylinder head's water jackets, (ii) separate from the cylinder head, and/or (iii) partially connected to the cylinder head anywhere from 0% to 100%. In this way, the integrated turbocharger housing utilizes cast-in water jackets to manage heat within the exhaust passages and to maintain the cylinder head's aluminum material to within desired, predetermined temperature limits. As noted, the water jackets can be connected to or separate from the cylinder head's water jackets.

In additional examples of the present disclosure, a charge air cooler (CAC) duct is integrated into the cylinder head of the internal combustion engine, thereby drastically reducing any potential flow noise in the duct due to the internally deep location in the cylinder head as opposed to an external thin wall.

Accordingly, the systems described herein provide a cast cylinder head with an integrally cast turbocharger housing that includes a fully integrated wastegate system, an integrated turbocharger housing water jacket and/or integrated wastegate housing water jacket, and a compressor outlet passage and charge air cooler duct integrally cast with the cylinder head casting. The integrated wastegate system includes a pressed in bushing and valve seat with a mechanically direct coupled rotary electric wastegate actuator. In some examples, the turbocharger housing water jacket is integrated with the existing cylinder head water jacket. In some examples, this is an extension of current water jackets and only requires modifying existing sand cores. As such, the cost and complexity associated with additional sand cores is avoided. In additional examples, the external duct, oil drain, and wastegate kinematics are fully integrated into the casting, which can significantly reduce radiated noise.

Figure 3:
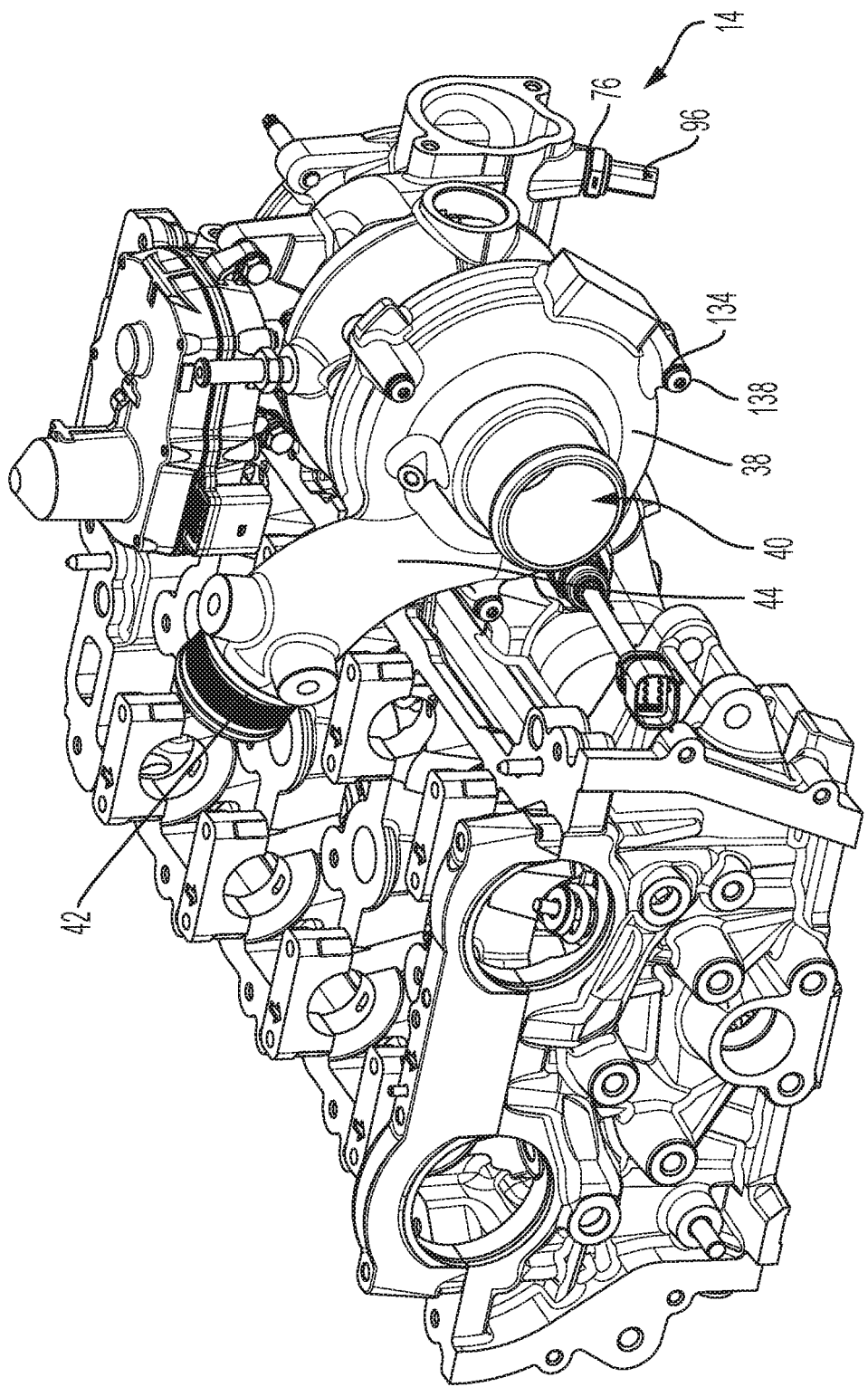
FIG. 3 is a perspective view of the cylinder head of FIG. 1 with various components assembled on the integrated turbocharger housing, in accordance with the principles of the present application.
Figure 15:
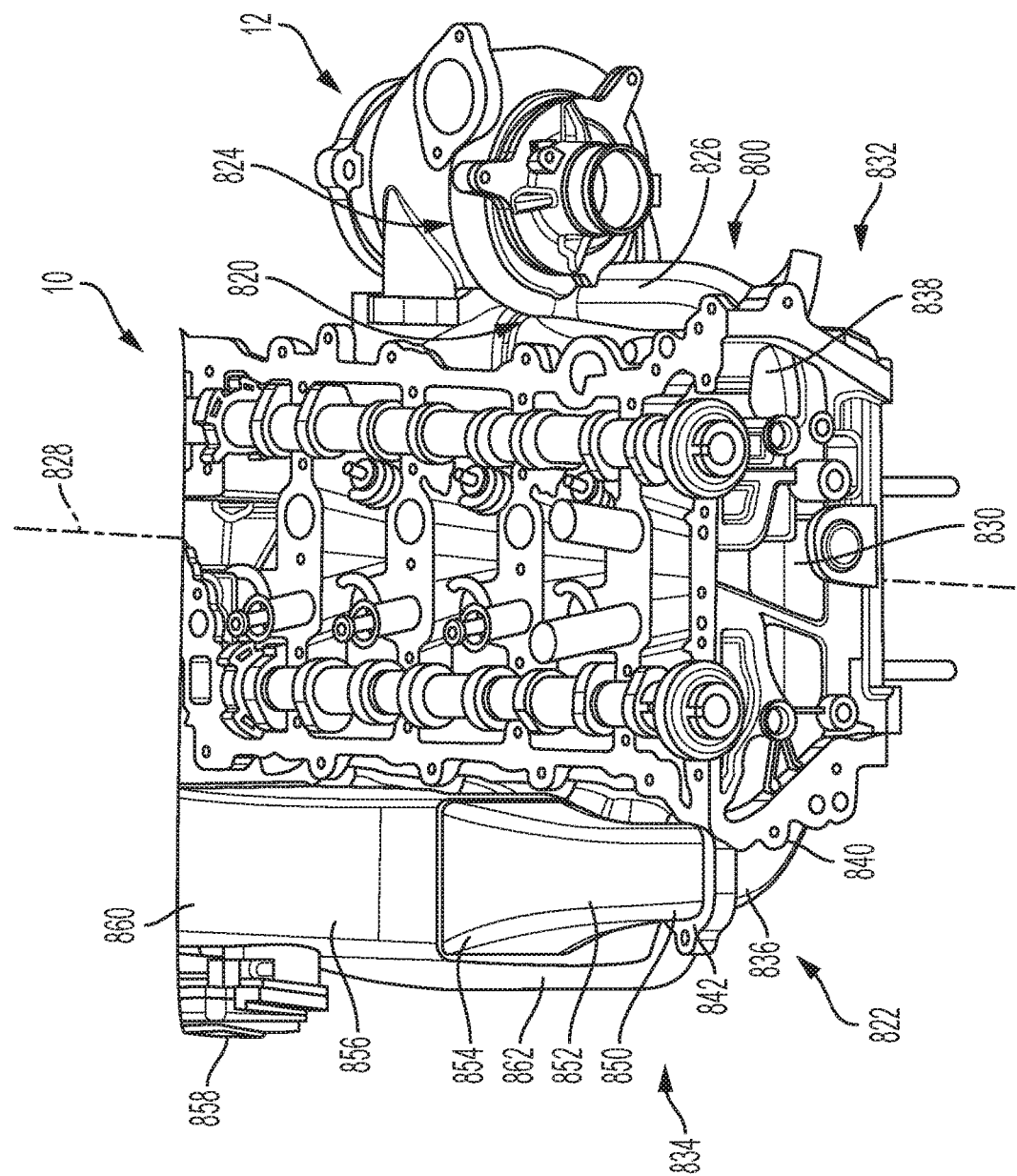
FIG. 15 is a perspective view of an example cylinder head with an integrally cast charge air cooling duct, in accordance with the principles of the present application.

With reference to FIGS. 1 and 2, an example cylinder head for an internal combustion engine is shown and indicated at reference numeral 10. In the example embodiment, the cylinder head 10 includes an integrated (cast-in) turbocharger housing 12 that makes up part of a turbocharger assembly 14 (see FIGS. 3 and 4). FIGS. 3 and 5 illustrate an example wastegate system 16 fully integrated into the turbocharger housing 12. FIGS. 6-14 illustrate example water jacket systems 18 for providing cooling to one or more portions of the integrated turbocharger housing 12 and/or integrated wastegate system 16, and FIG. 15 illustrates an example integrated charge air cooler (CAC) duct 800 cast into the cylinder head 10.

With reference now to FIGS. 1-4, the turbocharger assembly 14 will be described in more detail. In the example embodiment the turbocharger housing 12 is cast with the cylinder head 10 and generally includes a main housing 20 defining a cartridge bore 22, an inlet flange 24 defining a cartridge opening 26, and an outlet flange 28 defining an exhaust outlet 30. The cartridge bore 22 is configured to receive a turbocharger cartridge assembly 32 (FIG. 4), which is configured to align with a drain hole 34 (FIG. 1) for draining a lubricant (e.g., oil) supplied to the cartridge assembly 32 via a lubricant supply port 36 (FIG. 2) formed in the turbocharger housing 12.

As described herein in more detail, the cartridge opening 26 is configured to receive cartridge assembly 32 therein, followed by a compressor housing 38, to define a compressor inlet 40, as shown in FIG. 3. The compressor inlet 40 is fluidly coupled to a compressor outlet 42 of a compressor outlet duct 44, which is configured to provide compressed intake air to an intake manifold of the engine (not shown). Although illustrated as a separate component, one or more portions of compressor housing 38 may be integrally cast with the turbocharger housing 12 such as, for example the compressor outlet duct 44.

In the example embodiment, the turbocharger housing 12 includes an integrated (cast-in) turbine inlet duct 50 and wastegate inlet duct 52 (FIG. 1), which are respectively coupled to a turbine inlet 54 and a wastegate inlet 56 (FIG. 5). The turbine inlet 54 is configured to receive exhaust gas from an exhaust manifold of the engine (not shown), and direct the exhaust gas through a turbine outlet 58 formed in the turbocharger housing 12. As shown in FIG. 5, the turbine outlet 58 is configured to supply exhaust from the turbine of the cartridge assembly 32 to a wastegate chamber 60 defined by a wastegate housing 62 of the turbocharger housing 12. The exhaust from the wastegate chamber 60 is then supplied via exhaust outlet 30 to an exhaust system of the vehicle (not shown). As described herein in more detail, the wastegate housing 62 defines a valve seat 64 including the wastegate inlet 56, a wastegate actuator bore 66, and a wastegate valve assembly clearance 68.

With continued reference to FIGS. 1-4, the turbocharger housing 12 further defines a vent port 70, an opening/port 72, a coolant outlet 74, a temperature sensor opening/port 76 (FIG. 3), an opening/port 78, and an opening/port 80. In the example embodiment, the vent port 70 is configured to receive a fitting 82 for venting air bubbles from the water jacket system 18 through a line to a hot bottle (not shown). The port 72 is configured to receive a plug 84 (FIG. 4) configured to seal a channel 86 (e.g., cross-drill) connecting upper and lower water jackets of the water jacket system 18 formed in the turbocharger housing 12, as described herein in more detail.

In the example embodiment, the coolant outlet 74 is configured to direct coolant out of the water jacket system 18 and defines a flange surface 88 having a plurality of apertures 90 to receive fasteners 92 for coupling a thermostat 94 (FIG. 4) to the turbocharger housing 12. The thermostat 94 is configured to regulate coolant flow exiting the cylinder head 10 based on coolant temperature. The temperature sensor port 76 is configured to receive a temperature sensor 96 for sensing a temperature of the engine coolant flowing through the integrated water jacket system 18, and particularly through the coolant outlet 74.

In the example embodiment, port 78 is configured to receive a plug 100 (FIG. 4) to seal the water jacket system 18 at a location 102 where, in some examples, upper and lower water jackets fluidly connect, as described herein in more detail. Port 80 is configured to receive a plug 104 (FIG. 4) for sealing one end of a lubricant passage 106 (e.g., cross-drill), which fluidly couples the lubricant supply port 36 to the main oil gallery of the cylinder head 10. Additionally, as shown in FIG. 2, an O2 sensor port 144 is formed in the turbine inlet duct 50 and configured to receive an O2 sensor 146, which is configured to sense an oxygen content of the exhaust gases flowing through the turbine inlet duct 50.

Figure 4:
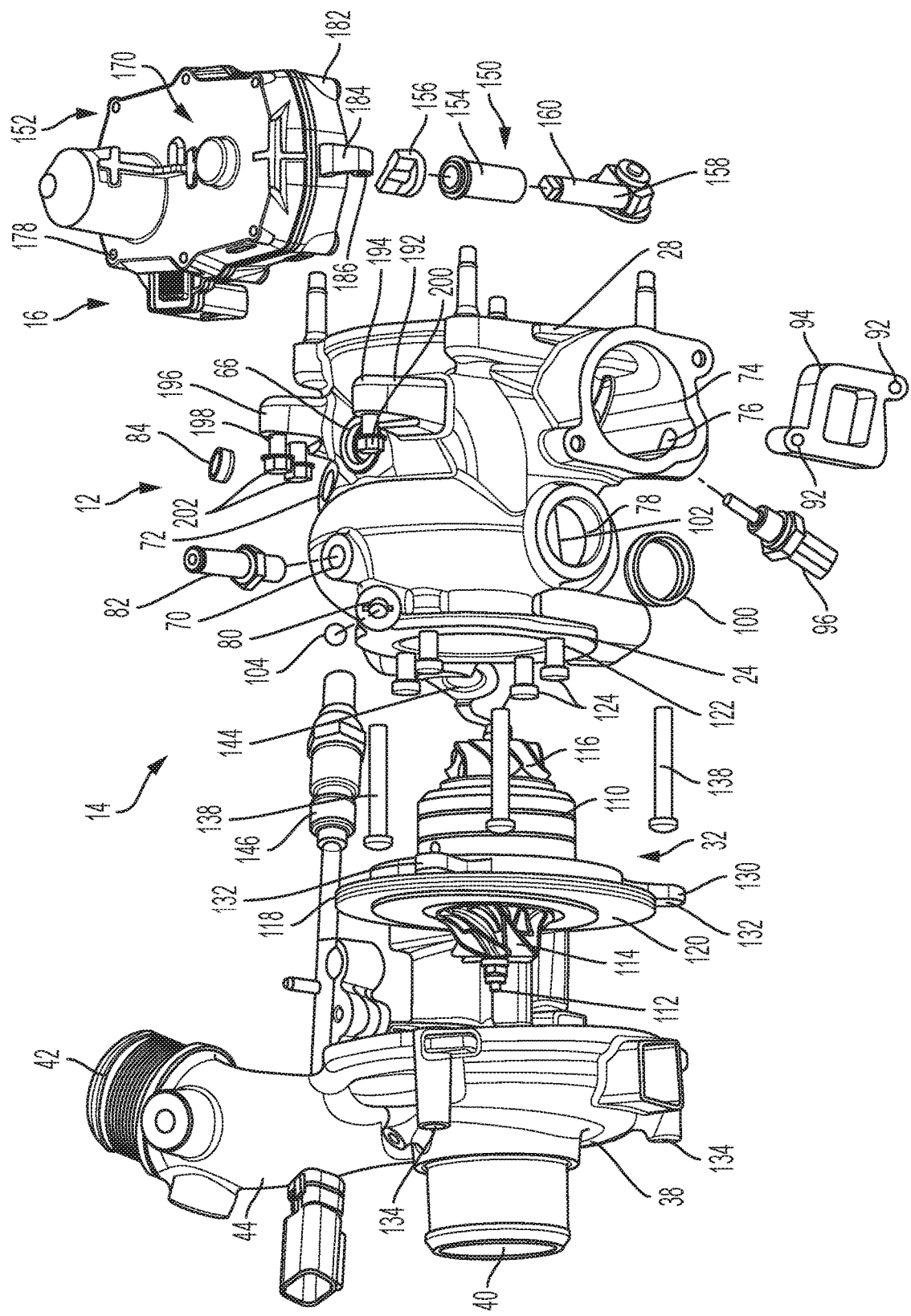
FIG. 4 is an exploded view of the cylinder head shown in FIG. 3, in accordance with the principles of the present application.
Figure 5:
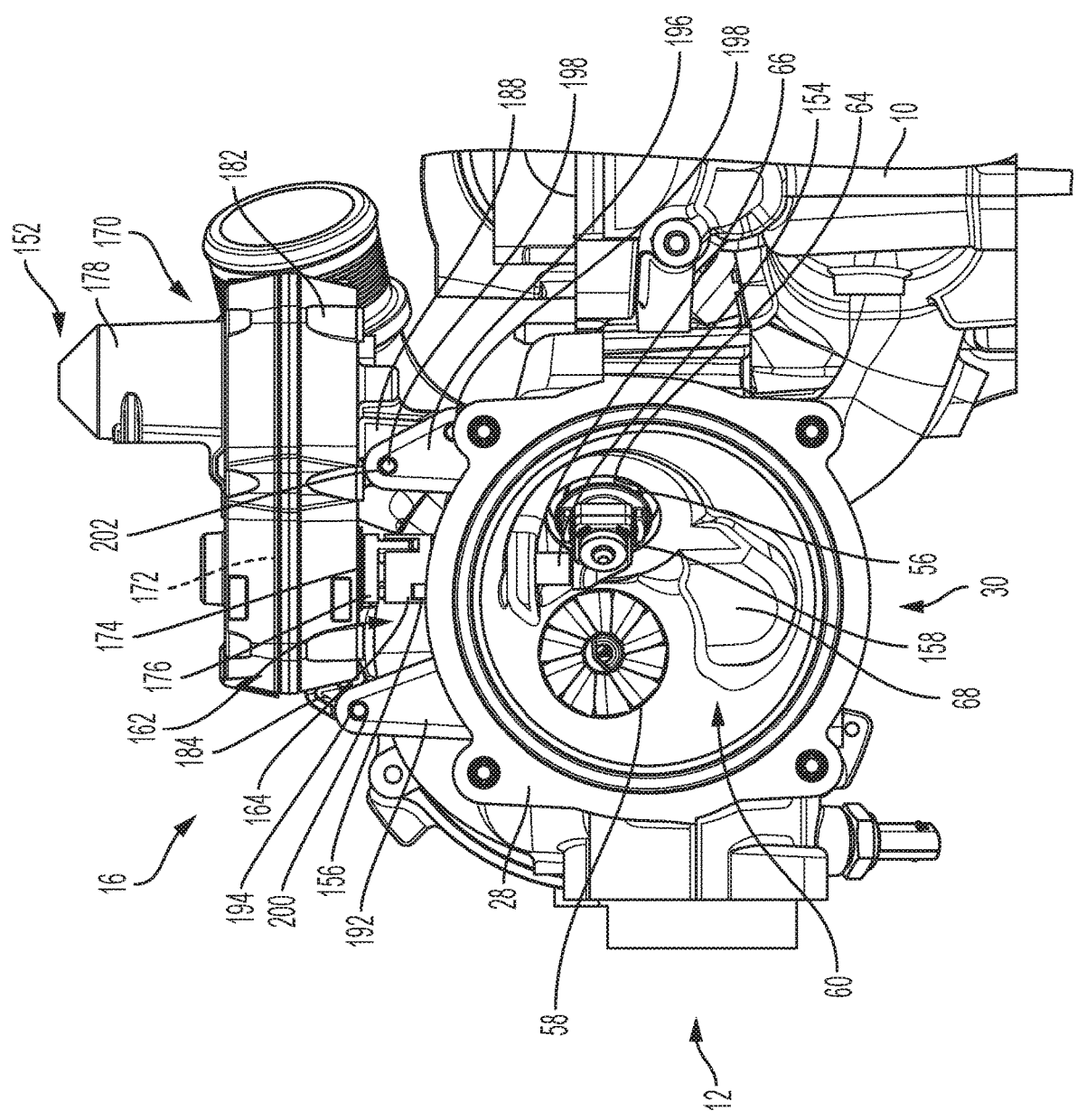
FIG. 5 is a side view of the integrated turbocharger housing shown in FIG. 3, in accordance with the principles of the present application.

With reference now to FIG. 4, the cartridge assembly 32 will be described in more detail. In the example embodiment, the cartridge assembly 32 generally includes a cartridge housing 110 having one or more bearings (not shown) rotatably supporting a shaft 112 that couples a compressor wheel 114 and a turbine wheel 116. The compressor end of the cartridge housing 110 includes a flange 118 having a plurality of circumferentially located apertures 120 configured to align with corresponding apertures 122 formed on the turbo housing inlet flange 24. A plurality of fasteners 124 (FIG. 4) are inserted through apertures 120, 122 to thereby couple cartridge assembly 32 to the turbocharger housing 12. Once coupled, the turbine wheel 116 is disposed at least partially within the turbine outlet 58.

As shown in FIG. 4, in the example implementation, the flange 118 further includes a plurality of radial projections 130 each having an aperture 132 configured to align with corresponding apertures 134 formed within a compressor housing 38, which is coupled to the cartridge assembly 32 via fasteners 138. As previously described, compressor housing 38 defines compressor inlet 40 and compressor outlet 42. The inlet 40 is configured to receive ambient air from an air intake (not shown) and supply the intake air to compressor wheel 114 for subsequent compression. The resulting compressed charge air is then directed to the engine intake manifold via compressor housing outlet 42.

With reference now to FIGS. 4 and 5, the wastegate system 16 will be describe in more detail. In the example embodiment, wastegate system 16 generally includes a wastegate valve assembly 150 and a wastegate valve actuator assembly 152. The wastegate valve assembly 150 and the wastegate valve actuator assembly 152 are coupled to the integrated turbocharger housing 12, which as noted above, includes the wastegate housing 62 that defines wastegate chamber 60, valve seat 64 with wastegate inlet 56, wastegate actuator bore 66, and wastegate valve assembly clearance 68.

In the example embodiment, the wastegate valve assembly 150 generally includes a bushing 154, a coupling 156, and a wastegate valve 158. The bushing 154 is inserted through the wastegate actuator bore 66 and includes an upper end configured to couple to the coupling 156, and a lower end configured to receive and couple to a shaft 160 of the wastegate valve 158. The wastegate valve assembly clearance 68 facilitates easy insertion of the wastegate valve 158 into the wastegate chamber 60 for subsequent coupling to the bushing 154. In one example, the shaft 160 is splined to the bushing 154, however it will be appreciated that various couplings are envisioned.

Moreover, in the illustrated example, the coupling 156 is one side of an Oldham coupling 162, which includes an intermediate member 164 disposed between first coupling 156 and a second coupling 176 of the wastegate valve actuator assembly 152. In this way, the Oldham coupling 162 is configured to operably couple the wastegate valve actuator assembly 152 to the wastegate valve assembly 150. However, it will be appreciated that wastegate system 16 may have any suitable coupling between the wastegate valve actuator assembly 152 and the wastegate valve assembly 150 that enables system 16 to function as described herein.

In the example embodiment, the wastegate valve actuator assembly 152 is a direct drive actuator and generally includes a housing 170 for housing a motor 172 having an output shaft 174. As shown in FIG. 5, the output shaft 174 is coupled to coupling 176. As illustrated in FIG. 4, housing 170 includes an upper housing 178 coupled to a lower housing 182, which includes a first coupling flange 184 having an aperture 186, and a second coupling flange 188 having apertures 190. As shown in FIG. 1, the integrated turbocharger housing 12 is cast with a first outwardly extending post 192 having an aperture 194, and a second outwardly extending post 196 having apertures 198. As shown in FIG. 5, the apertures 186, 194 are configured to be aligned to receive a fastener 200 for coupling the first coupling flange 184 to the first outwardly extending post 192. Similarly, the apertures 190, 198 are configured to be aligned to receive fasteners 202 for coupling the second coupling flange 188 to the second outwardly extending post 196.

Accordingly, in the example embodiment, the wastegate valve actuator assembly 152 is positioned to directly drive the wastegate valve 158 to selectively open and close the wastegate inlet 56 by selectively seating the wastegate valve 158 against the wastegate valve seat 64. The direct drive wastegate valve actuator assembly 152 enables opening of the wastegate beyond the typical 30° maximum to beyond 90° as far as is needed to fully bypass the wastegate inlet duct 52. In some examples, the wastegate is opened beyond 180° to increase wastegate flow by blocking exducer flow of the turbine wheel 116 with a backside 166 of the wastegate valve 158.

With reference now to FIGS. 5-14, the water jacket systems 18 will be described in more detail. The water jacket systems 18 generally include a turbocharger housing water jacket and/or wastegate housing water jacket configured to provide a flow of coolant (e.g., water) around the integrated turbocharger housing 12 for cooling thereof. In some examples, the turbocharger housing water jackets include cooling passages around the wastegate features in order to provide cooling to the aluminum housing. This enables the integrated turbocharger housing to attach directly to the engine's emissions control catalyst inlet. Such systems may incorporate separate, independent, or partially connected water jackets to cool the wastegate support features and/or surrounding exhaust passage from the turbocharger turbine wheel to the housing outlet. In this way, the wastegate housing assembly can be integrated to the cylinder head and turbocharger housing casting, with water jackets added.

Figure 6:
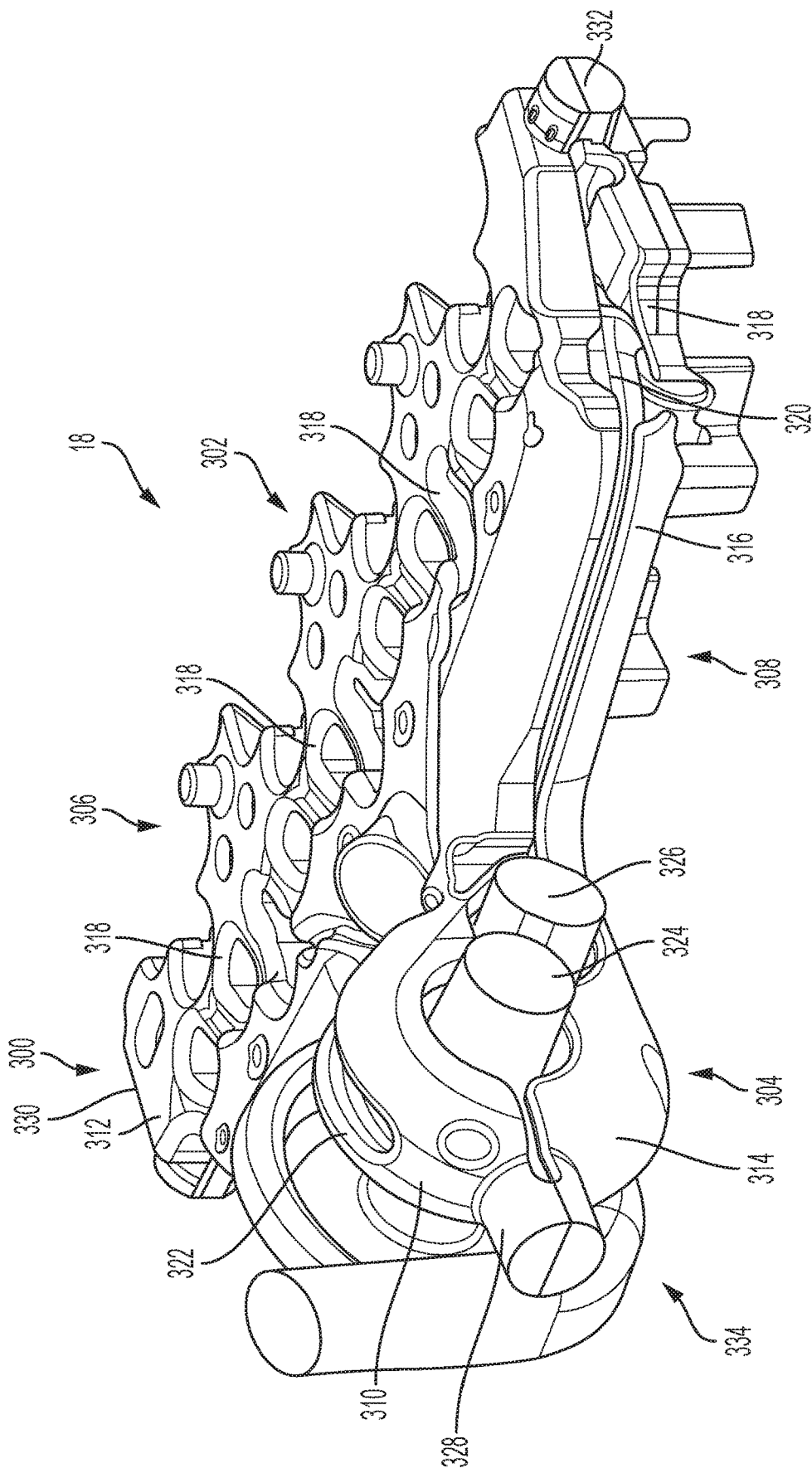
FIG. 6 is a perspective view of one example water jacket system that may be cast within the cylinder head of FIG. 1, in accordance with the principles of the present application.
Figure 12:
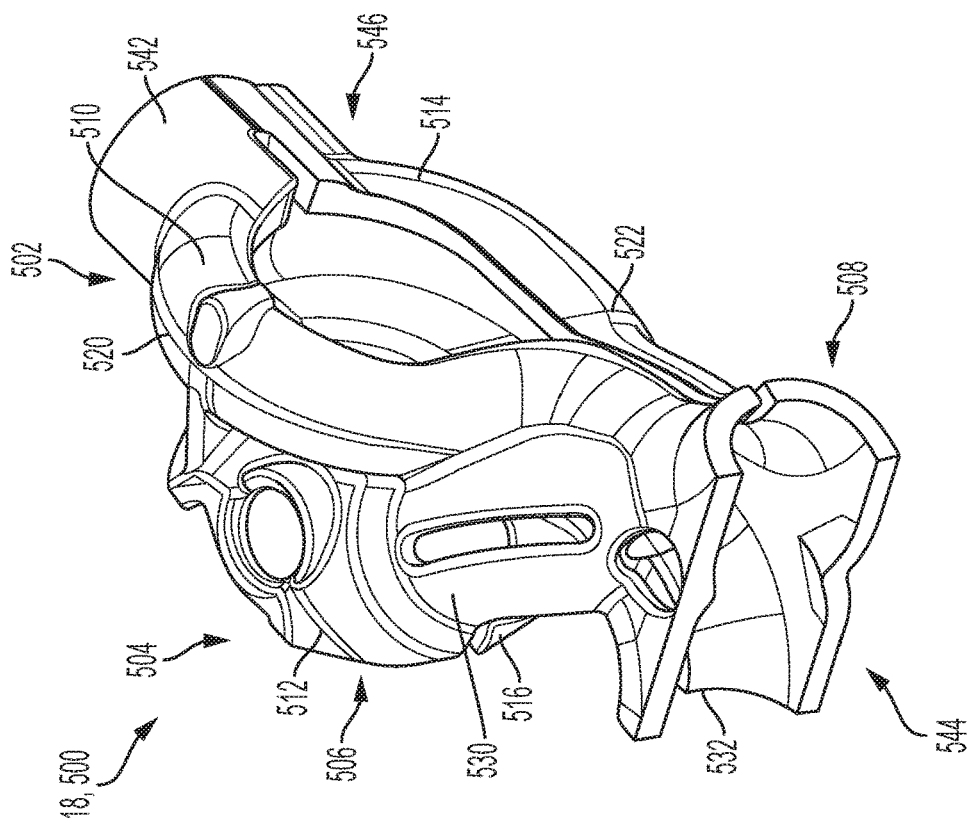
FIG. 12 is a perspective view of the water jacket system shown in FIG. 11, in accordance with the principles of the present application.
Figure 11:
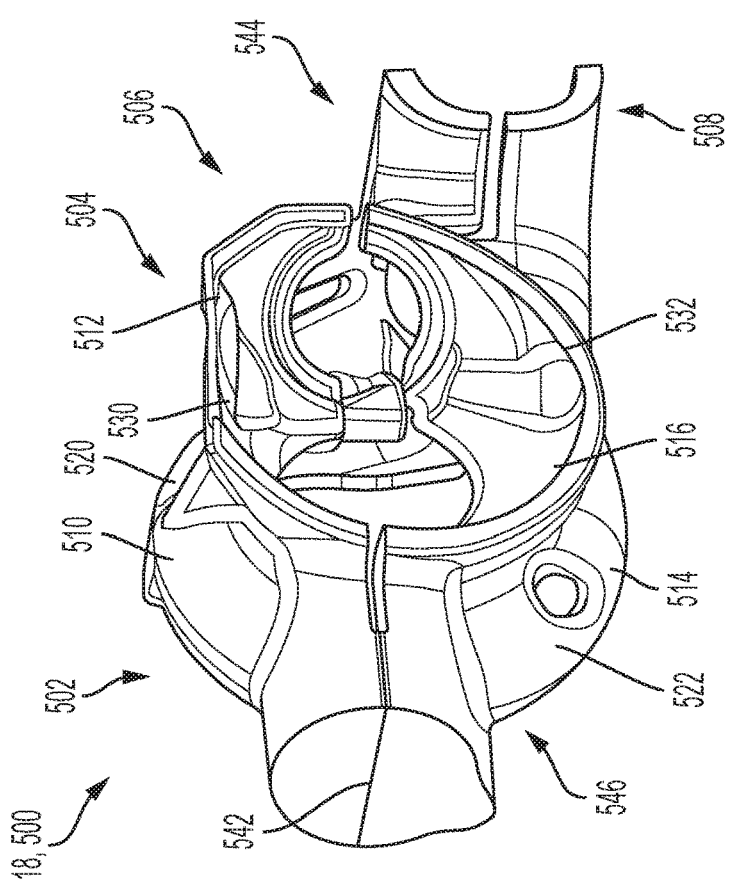
FIG. 11 is a perspective view of yet another example water jacket system that may be cast within the cylinder head shown in FIG. 1, in accordance with the principles of the present application.

FIG. 6 illustrates a first embodiment where the water jacket system 18 is integrated with a cylinder head water jacket and configured to only cool the turbine portion of turbocharger housing 12. FIGS. 7-10 illustrate a second embodiment where the water jacket system 18 is integrated with the cylinder head water jacket and configured to cool both the turbine and wastegate portion of turbocharger housing 12. FIGS. 11 and 12 illustrate a third embodiment where the water jacket system 18 is separate from or integrated with the cylinder head water jackets and includes two water jackets configured to cool both the turbine and wastegate portions of the turbocharger housing 12. FIG. 13 illustrates a fourth embodiment where the water jacket system 18 is separate from the cylinder head water jackets and includes three water jackets configured to cool both the turbine and wastegate portions of the turbocharger housing 12. FIG. 14 illustrates a fourth embodiment where the water jacket system 18 is separate from the cylinder head water jackets and includes four water jackets configured to cool both the turbine and wastegate portions of the turbocharger housing 12

Turning now to FIG. 6, the first embodiment of water jacket system 18 is shown as a water jacket core 300 that, after casting, represents a space or void cast into the cylinder head 10 and integrated turbocharger housing 12. The void subsequently defines one or more passages to receive a flow of coolant for cooling the cylinder head 10 and turbocharger housing 12. As such, in the illustrated example, the volume for coolant flow is represented in solid.

In the example embodiment, the water jacket core 300 generally includes a cylinder head water jacket portion 302 and a turbocharger housing water jacket portion 304. The cylinder head water jacket portion 302 is integrated (cast) into the cylinder head 10, and the turbocharger housing water jacket portion 304 is integrated (cast) into the turbocharger housing 12. In the illustrated example, the cylinder head water jacket portion 302 is fluidly coupled to the turbocharger housing water jacket portion 304, and water jacket portions 302, 304 are formed by an upper water jacket 306 and a lower water jacket 308.

The upper water jacket 306 defines an upper turbocharger housing water jacket 310 integrated (e.g., fluidly coupled) with an upper cylinder head water jacket 312, and the lower water jacket 308 defines a lower turbocharger housing water jacket 314 integrated with a lower cylinder head water jacket 316. The upper and lower cylinder head water jackets 312, 316 each define a plurality of passages 318 (shown in solid) to enable coolant to flow therethrough and provide cooling to various cylinder head components including an exhaust manifold (exhaust flow 320 shown in solid). Similarly, the upper and lower turbocharger housing water jackets 310, 314 define passages 322 (shown in solid) for flowing coolant around the integrated turbocharger housing 12 for cooling thereof, including a turbine exhaust flow 324 a wastegate exhaust flow 326.

As shown, the upper and lower turbocharger housing water jackets 310, 314 merge (fluidly connect) at an end coupling 328 of the turbocharger housing 12. Similarly, the upper and lower cylinder head water jackets 312, 316 merge at end couplings 330, 332, and the upper cylinder head water jacket 312 includes a coolant outlet 334 to a thermostat (not shown). As such, in the illustrated arrangement, flow of coolant can begin in the lower cylinder head water jacket 316 and flow through passages 318 to the lower turbocharger housing water jacket 314 to cool the turbocharger housing 12. The flow then passes to upper turbocharger housing water jacket 310 via end coupling 328, further cools turbocharger housing 12 and is supplied to the upper cylinder head water jacket 312, through passages 318, and finally through coolant outlet 334. It will be appreciated, however, that various other flow control arrangements are contemplated depending on various design considerations (e.g., materials, packaging requirements), desired temperature and flow characteristics, etc.

Figure 7:
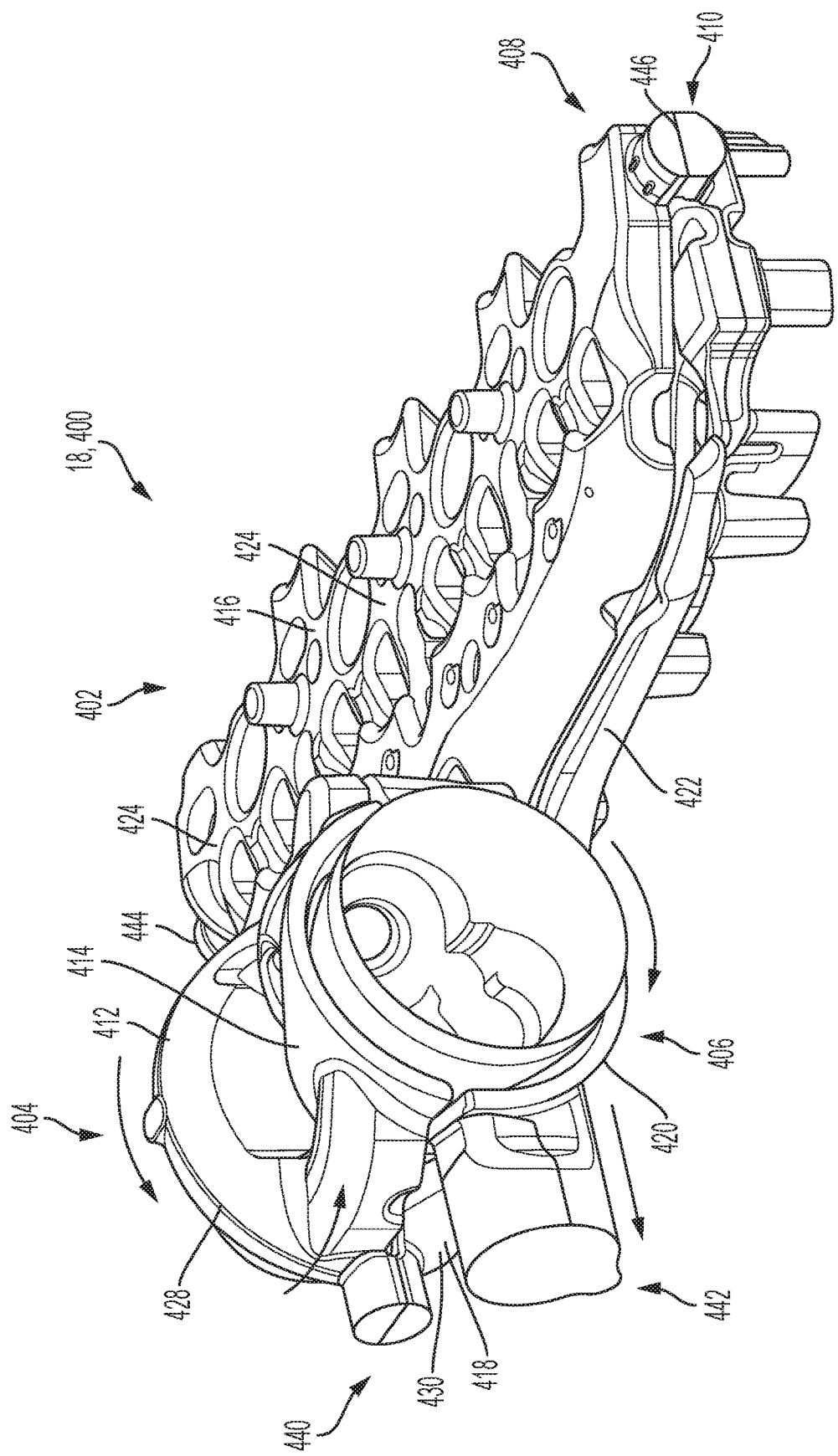
FIG. 7 is a perspective view of another example water jacket system that may be cast within the cylinder head of FIG. 1, in accordance with the principles of the present application.
Figure 8:
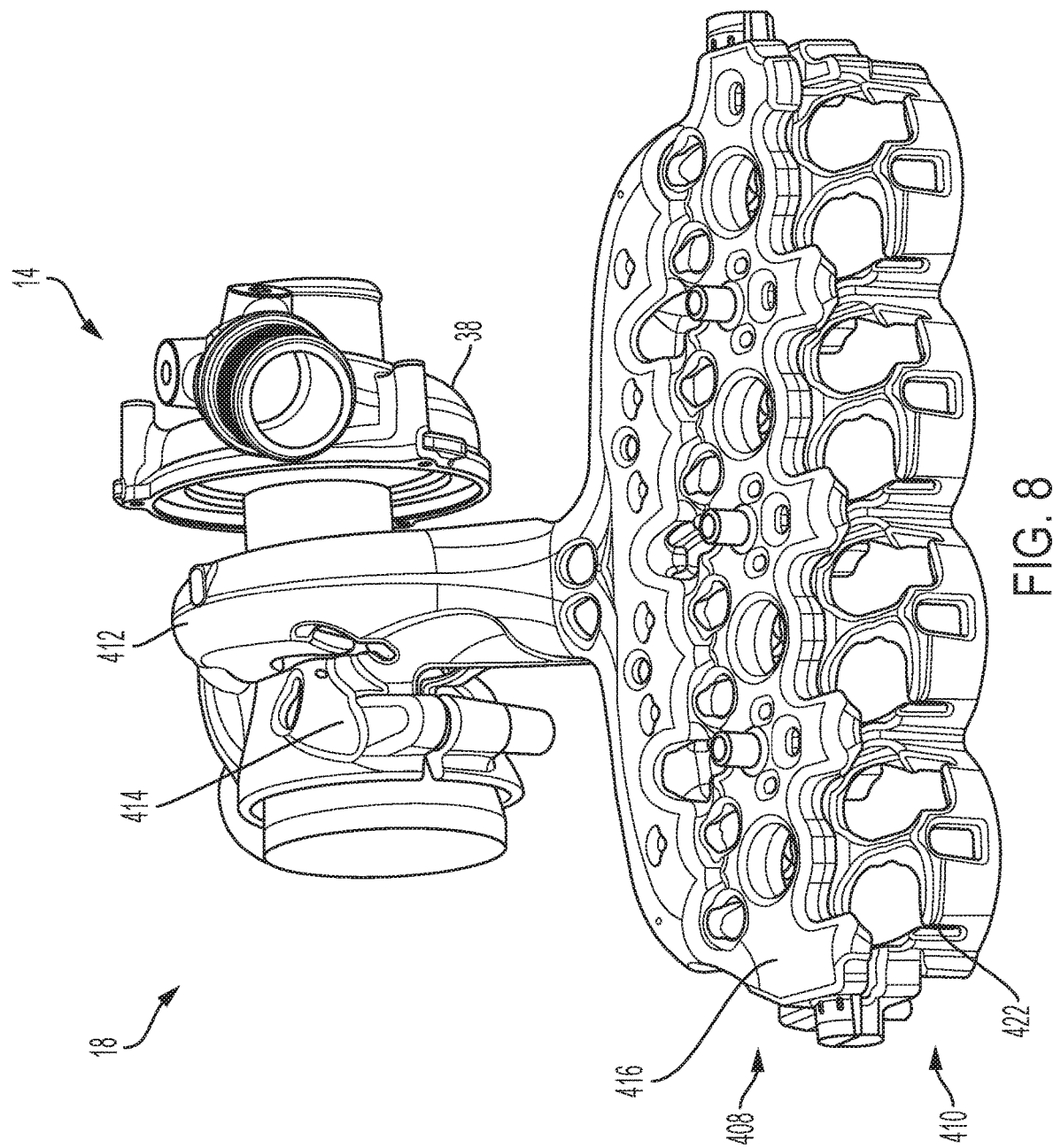
FIG. 8 is a perspective view of the water jacket system of FIG. 7, in accordance with the principles of the present application.

Turning now to FIGS. 7-10, the second embodiment of the water jacket system 18 is shown. FIG. 7 illustrates water jacket system 18 as a water jacket core 400 that, after casting, represents a space or void cast into the cylinder head 10 and integrated turbocharger housing 12. The void subsequently defines one or more passages to receive a flow of coolant for cooling the cylinder head 10 and turbocharger housing 12. As such, in the illustrated example, the volume for coolant flow is represented in solid.

In the example embodiment, the water jacket core 400 generally includes a cylinder head water jacket portion 402, a turbocharger housing water jacket portion 404, and a wastegate housing water jacket portion 406. The cylinder head water jacket portion 402 is integrated (cast) into the cylinder head 10, and the turbocharger housing water jacket portion 404 and wastegate housing water jacket portion 406 are integrated (cast) into the turbocharger housing 12. In the illustrated example, the cylinder head water jacket portion 402 is fluidly coupled to the turbocharger housing water jacket portion 404 and the wastegate housing water jacket portion 406. As shown, the water jacket portions 402, 404, 406 are formed by an upper water jacket 408 and a lower water jacket 410.

The upper water jacket 408 defines an upper turbocharger housing water jacket 412 and upper wastegate housing water jacket 414 integrated (e.g., fluidly coupled) with an upper cylinder head water jacket 416. Similarly, the lower water jacket 410 defines a lower turbocharger housing water jacket 418 and lower wastegate housing water jacket 420 integrated with a lower cylinder head water jacket 422.

Figure 9:
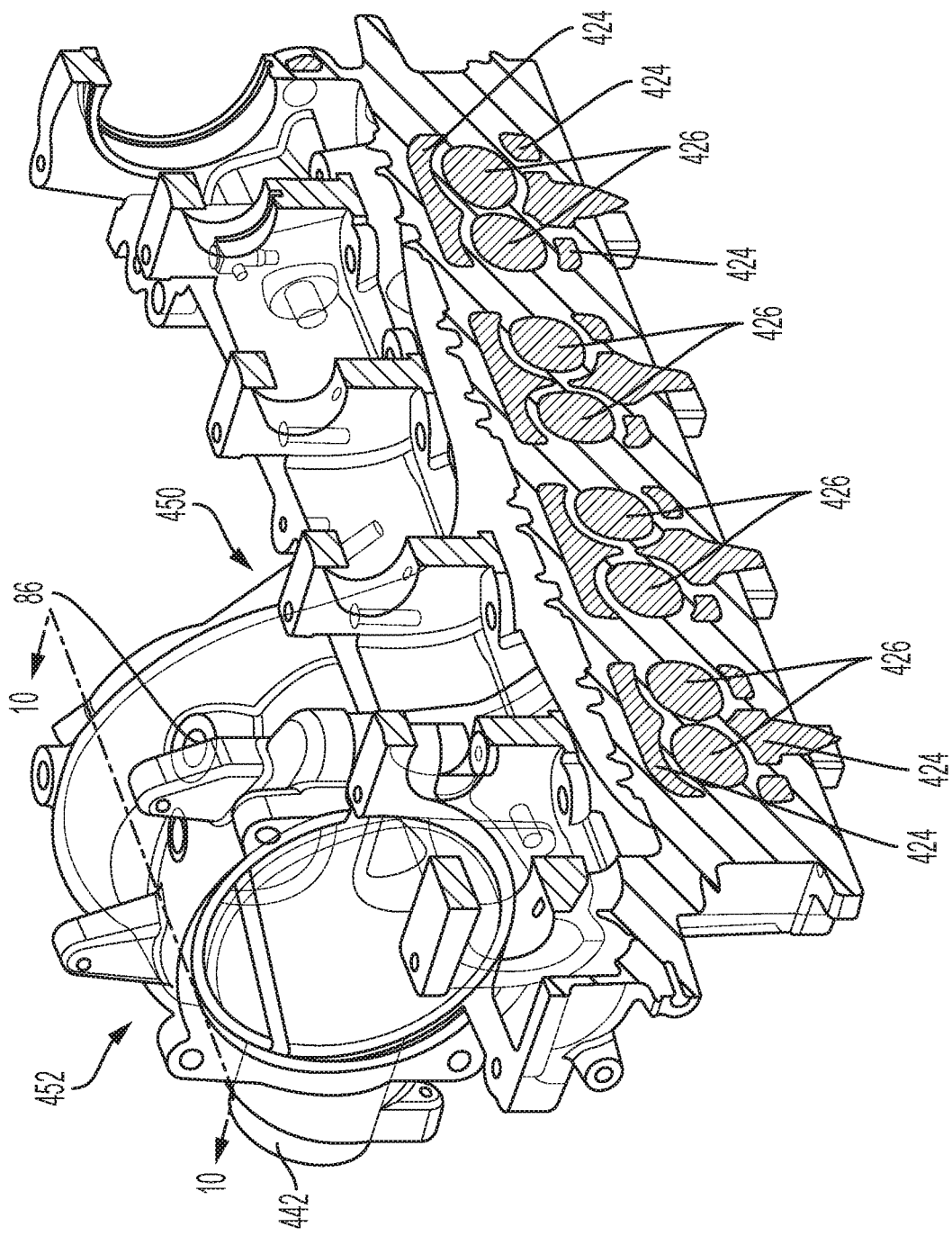
FIG. 9 is a perspective view of the water jacket system of FIG. 7 located within the cylinder head (shown in phantom), in accordance with the principles of the present application.

In the example embodiment, the upper and lower cylinder head water jackets 416, 422 each define a plurality of passages 424 (shown in solid) to enable coolant to flow therethrough and provide cooling to various cylinder head components such as exhaust manifold passages 426 (e.g., see FIG. 9). Similarly, the upper and lower turbocharger housing water jackets 412, 418 define respective passages 428, 430 (see FIG. 10) for flowing coolant around the integrated turbocharger housing 12 (e.g., turbine portion) for cooling thereof. And similarly still, the upper and lower wastegate housing water jackets 414, 420 define respective passages 432, 434 (see FIG. 10) for flowing coolant around the wastegate housing 62 for cooling thereof.

As shown in the example embodiment, the upper and lower turbocharger housing water jackets 412, 418 merge (e.g., fluidly connect) at an end coupling 440 (see FIG. 7) and also via channel 86 (see FIG. 9), and the lower wastegate housing water jacket 420 is fluidly coupled to a coolant outlet 442 such as coolant outlet 74. Similarly, the upper and lower cylinder head water jackets 416, 422 merge at end couplings 444, 446.

As such, in the illustrated arrangement, flow of coolant can begin in both the upper and lower cylinder head water jackets 416, 422 and flow through passages 424. As shown in FIG. 10, a first portion of the coolant in the upper cylinder head water jacket 416 is directed to the passage 432 of upper wastegate housing water jacket 414, and a second portion of the coolant is directed to the passage 428 of the upper turbocharger housing water jacket 412. The first and second portions of coolant respectively cool the wastegate and turbocharger housings 60, 12 as they pass from a cylinder head side 450 to an opposite side 452 where they subsequently merge. The merged first and second portions are then directed to the lower water jacket 410 via end coupling 440. Similarly, a first portion of the coolant in the lower cylinder head water jacket 422 is directed to the passage 434 of the lower wastegate housing water jacket 420, and a second portion of the coolant is directed to the passage 430 of the lower turbocharger housing water jacket 418. The first and second portions of coolant respectively cool the wastegate and turbocharger housings 60, 12 as they pass from the cylinder head side 450 to the opposite side 452 where they subsequently merge with coolant from the upper water jacket 408 (via end coupling 440) and are directed out of the integrated turbocharger housing 12 via coolant outlet 442.

Turning now to FIGS. 11 and 12, the third embodiment of water jacket system 18 is shown as a water jacket core 500 that, after casting, represents a space or void cast into the cylinder head 10 and integrated turbocharger housing 12. The void subsequently defines one or more passages to receive a flow of coolant for cooling the cylinder head 10 and turbocharger housing 12. As such, in the illustrated example, the volume for coolant flow is represented in solid.

In the example embodiment, the water jacket core 500 generally includes a turbocharger housing water jacket integrated with cylinder head water jackets (not shown). However, water jacket core 500 may be separate from the cylinder head water jackets, which enables an independent, separate water jacket for the turbocharger and/or wastegate housings 12, 60 and the cylinder head 10. The separate water jackets can have separately controlled flow cooling circuits. In still other examples, the turbocharger housing cooling system is partially linked with waterflow in the cylinder head's water jacket, for example, via drilled holes, passages, hose connectors, or the like.

In the illustrated example, the water jacket system 18 generally includes a turbocharger housing water jacket portion 502 and a wastegate housing water jacket portion 504. The turbocharger housing water jacket portion 502 and wastegate housing water jacket portion 504 are integrated (cast) into the turbocharger housing 12. In the illustrated example, the turbocharger housing water jacket portion 502 is fluidly coupled to the wastegate housing water jacket portion 504, and water jacket portions 502, 504 and are formed by an upper water jacket 506 and a lower water jacket 508.

The upper water jacket 506 defines an upper turbocharger housing water jacket 510 integrated (e.g., fluidly coupled) with an upper wastegate housing water jacket 512, and the lower water jacket 508 defines a lower turbocharger housing water jacket 514 integrated with a lower wastegate housing water jacket 516. In the example embodiment, the upper and lower turbocharger housing water jackets 510, 514 define respective passages 520, 522 (shown in solid) to enable coolant flow within the integrated turbocharger housing 12 for cooling thereof. Similarly, the upper and lower wastegate housing water jackets 512, 516 define respective passages 530, 532 (shown in solid) for flowing coolant around the wastegate housing 62 for cooling thereof. As shown in FIG. 11, the upper and lower turbocharger housing water jackets 510, 514 merge (e.g., fluidly connect) at a coolant outlet 542 such as coolant outlet 74.

As such, in the illustrated arrangement a flow of coolant is provided (e.g., from cylinder head water jackets, not shown) to a cylinder head side 544 of both the upper and lower water jackets 506, 508 and subsequently directed through turbocharger housing water jacket passages 520, 522 and wastegate housing water jacket passages 530, 532. Specifically, a first portion of the coolant in the cylinder side of upper water jacket 506 is directed to the passage 520 of upper turbocharger housing water jacket 510, and a second portion of the coolant is directed to the passage 530 of the upper wastegate housing water jacket 512. The first and second portions of coolant respectively cool the wastegate and turbocharger housings 62, 12 as they pass from cylinder head side 544 to an opposite side 546 where they subsequently merge and exit turbocharger housing 12 via coolant outlet 542.

Similarly, a first portion of the coolant in the cylinder side of lower water jacket 508 is directed to the passage 522 of lower turbocharger housing water jacket 514, and a second portion of the coolant is directed to the passage 532 of the lower wastegate housing water jacket 516. The first and second portions of coolant respectively cool the wastegate and turbocharger housings as they pass from cylinder head side 544 to the opposite side 546 where they subsequently merge and exit turbocharger housing 12 via coolant outlet 542.

FIG. 13 illustrates the fourth embodiment of water jacket system 18 shown as a water jacket core 600 that, after casting, represents a space or void cast into the cylinder head 10 and integrated turbocharger housing 12. The void subsequently defines one or more passages to receive a flow of coolant for cooling the cylinder head 10 and turbocharger housing 12. As such, in the illustrated example, the volume for coolant flow is represented in solid. In the example embodiment, the water jacket core 600 generally includes a turbocharger housing water jacket separate from the cylinder head water jackets. As such, water jacket core 600 is similar to water jacket core 500 except that water jacket core 600 is formed from three separate cores rather than the two separate upper and lower water jacket cores that form water jacket core 500.

As shown in the illustrated embodiment, water jacket core 600 is formed with an upper water jacket 602 defining a separate upper turbocharger housing water jacket 604 and upper wastegate housing water jacket 606. A lower water jacket 608 includes a combined or integrated lower turbocharger housing water jacket 610 and lower wastegate housing water jacket 612, similar to lower water jacket 508. The upper and lower turbocharger housing water jackets 604, 610 merge (e.g., fluidly connect) at and end coupling 614 and subsequently direct coolant via the lower wastegate housing water jacket 612 to a coolant outlet 616. Coolant passing through the separate upper wastegate housing water jacket 606 is directed out of turbocharger housing 12 via a separate coolant outlet 618.

FIG. 14 illustrates the fifth embodiment of water jacket system 18 shown as a water jacket core 700 that, after casting, represents a space or void cast into the cylinder head 10 and integrated turbocharger housing 12. The void subsequently defines one or more passages to receive a flow of coolant for cooling the cylinder head 10 and turbocharger housing 12. As such, in the illustrated example, the volume for coolant flow is represented in solid. In the example embodiment, the water jacket core 700 generally includes a turbocharger housing water jacket separate from the cylinder head water jackets. As such, water jacket core 700 is similar to water jacket core 500 except that water jacket core 700 is formed from four separate cores rather than the two separate upper and lower water jacket cores that form water jacket core 500.

As shown in the illustrated embodiment, water jacket core 700 is formed with an upper water jacket 702 defining a separate upper turbocharger housing water jacket 704 and upper wastegate housing water jacket 706. A lower water jacket 708 defines a separate lower turbocharger housing water jacket 710 and lower wastegate housing water jacket 712. The upper and lower turbocharger housing water jackets 704, 710 merge (e.g., fluidly connect) at and end coupling 714 and subsequently direct coolant via the lower wastegate housing water jacket 712 to a coolant outlet 716. Coolant passing through the separate upper wastegate housing water jacket 706 is directed out of turbocharger housing 12 via a separate coolant outlet 718.

With further reference to FIG. 15, in one example implementation of integrated cylinder head 10 and turbocharger housing 12, a charge air (CAC) passage or duct 800 is also integrated (cast) into the cylinder head 10. The integrated CAC passage 800 includes a first end 820 and an opposite second end 822. The first end 820 is integrated with a compressor outlet 824 of the turbocharger housing 12. The integrated CAC passage 800 also includes a first section 826 extending parallel to or substantially parallel to a longitudinal axis 828 of the cylinder head 10 and turbocharger housing 12. A second section 830 of the CAC passage 800 extends orthogonal to or substantially orthogonal to the longitudinal axis 828 as it extends from a first side 832 of the cylinder head 10 to an opposite second side 834 of the cylinder head 10. A third section 836 of the CAC passage 800 extends orthogonal to or substantially orthogonal to both the longitudinal axis 828 and the second section 830. The first section 826 and the second section 830 may be joined by an integral elbow connector 838 (e.g., 90°), and the second section 830 and the third section 836 may be joined by an integral elbow connector 840 (e.g., 90°).

In the example embodiment, the second end 822 of CAC passage 800 includes a flange 842 configured to couple to a first end 850 of an elbow duct 852 (e.g., 90°). An opposite second end 854 of the elbow duct 852 is configured to couple to a CAC 856, which cools the compressed charge air and supplies it to a throttle body 858 disposed on an intake duct 860. As shown, the intake duct 860 finally supplies the cooled charge air to an intake manifold 862 of the engine. Accordingly, the cylinder head 10 includes the integrally cast CAC passage 800 to supply compressed (boosted) air to the CAC 856, which is fluidly connected to the intake manifold 862, thereby reducing parts and obviating the need for coupling a separate duct between the compressor outlet and CAC inlet.

Described herein are systems and methods for a cylinder head cast with integrated components including a turbocharger housing with integrated wastegate and an external CAC passage. The cylinder head with integrated turbocharger housing reduces the packaging space required versus separate, bolt on components, thereby providing tremendous cost and packaging advantage. Unlike traditional bolt-on turbocharger systems which dissipate heat via conduction to attached components and convection to ambient air in the engine compartment and also require heat shields and upgraded materials, the integrated turbocharger housing described herein advantageously eliminates the need for heat shields and reduces material requirements. In this way, the described systems reduce mass/packaging, simplify assembly, provide full bypass with a direct drive integrated wastegate system, significantly reduce noise by integrating otherwise separate components, and provide a unique cooling with integrated turbocharger/wastegate housing water jackets.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A cylinder head assembly for an internal combustion engine, the assembly comprising:
   a cast cylinder head;
   a turbocharger housing integrally cast with the cylinder head;
   a wastegate housing integrally cast with the cylinder head and the turbocharger housing; and
   a water jacket cast into the cylinder head and the integrally cast turbocharger housing and wastegate housing, the water jacket extending from a first end to an opposite second end and comprising:
      separate upper and lower turbocharger housing water jackets cast into the integrally cast turbocharger housing;
      separate upper and lower wastegate housing water jackets cast into the integrally cast wastegate housing; and
      separate upper and lower cylinder head water jackets cast into the cylinder head,
      wherein the upper cylinder head water jacket receives a first flow of coolant at the water jacket first end to cool exhaust gas flow in an exhaust manifold, and subsequently supplies the first flow of coolant to the upper turbocharger housing water jacket and the upper wastegate housing water jacket disposed at the water jacket second end,
      wherein the lower cylinder head water jacket receives a second flow of coolant at the water jacket first end to further cool the exhaust gas flow, and subsequently supplies the second flow of coolant to the lower turbocharger housing water jacket and the lower wastegate housing water jacket disposed at the water jacket second end,
      wherein the first and second flows of coolant are separated as they flow between the first and second ends of the water jacket.

2. The cylinder head assembly of claim 1, wherein the integrally cast turbocharger housing includes an integrated turbine inlet duct configured to direct a turbine portion of the exhaust gas flow to a turbocharger turbine wheel,
   wherein the integrally cast wastegate housing includes an integrated wastegate duct configured to direct a wastegate portion of the exhaust gas flow to a wastegate chamber defined in the integrally cast wastegate housing.

3. The cylinder head assembly of claim 1, wherein the integrally cast turbocharger housing is configured to direct a flow of exhaust gas from a turbocharger turbine between the upper turbocharger housing water jacket and the lower turbocharger housing water jacket, and wherein the upper and lower turbocharger housing water jackets encapsulate a turbine volute of the turbocharger housing.

4. The cylinder head assembly of claim 1, wherein the integrally cast wastegate housing is configured to direct a flow of wastegate exhaust gas between the upper wastegate housing water jacket and the lower wastegate housing water jacket.

5. The cylinder head assembly of claim 1, wherein the upper turbocharger housing water jacket and the lower turbocharger housing water jacket are fluidly coupled at a first end coupling of the integrally cast turbocharger housing disposed at the water jacket opposite second end,
   wherein the upper cylinder head water jacket and the lower cylinder head water jacket are fluidly coupled a second end coupling disposed at the water jacket first end, and
   wherein the first and second flows are separate and distinct until they merge at the first and second end couplings.

6. The cylinder head assembly of claim 5, wherein the upper wastegate housing water jacket and the lower wastegate housing water jacket are fluidly coupled to the upper turbocharger housing water jacket and the lower turbocharger housing water jacket.

7. The cylinder head assembly of claim 1, wherein the integrally cast wastegate housing includes a coolant outlet formed therein and configured to receive the flow of coolant from the integrally cast water jacket, and further comprising a thermostat disposed in the coolant outlet.

8. The cylinder head assembly of claim 1, wherein the water jacket is formed by one of: (i) two water jacket cores, (ii) three water jacket cores, and (iii) four water jacket cores.

* * * * *